United States Patent

[11] 3,539,174

[72] Inventor Domenic Borello
    142 Nyac Ave., Pelham, New York 10803
[21] Appl. No. 766,527
[22] Filed Oct. 10, 1968
[45] Patented Nov. 10, 1970

[54] STUD-SPACING GUIDE
    2 Claims, 5 Drawing Figs.
[52] U.S. Cl............................................. 269/319
[51] Int. Cl.............................................. B25b 5/08
[50] Field of Search.................................. 269/1, 6,
    36, 318, 319, 321(P), 217

[56] References Cited
UNITED STATES PATENTS
1,128,527  2/1915  Russell..................269/321(F)UX
3,012,593  12/1961 Williams...................269/321(E)

Primary Examiner—Robert C. Riordon
Assistant Examiner—Donald D. Evenson
Attorney—Myron Amer ABSTRACT: A device for facilitating the spacing and attachment, during typical wall construction, of studs to a horizontal beam or structural member, the device having not only spacing guides thereon for determining the proper spacing of the studs but also means for being clamped to the beam so that during attachment of a stud it is held against movement from its selected location.

Patented Nov. 10, 1970 3,539,174

INVENTOR.
DOMENIC BORELLO
BY
Friedman & Goodman
Attorneys

STUD-SPACING GUIDE

The present invention relates generally to wall construction, and more particularly to an improved guide for determining the spacing and facilitating the securement of wall-supporting studs during wall construction.

As generally understood, in a typical wall construction the vertical supports or studs thereof are usually attached to a horizontal beam or structural member at prescribed intervals and in sufficient number that, without some aid, the determination of the required stud locations is a tedious task. Accordingly, there are available several models of spacing guides by which stud locations can readily and accurately be determined. The time and work saving aspects of these known stud spacing guides is significantly minimized, however, by the difficulties encountered in securing or attaching the studs to the beam at their selected locations therealong, a problem which is not also solved by any prior art stud spacing guide.

Broadly, it is an object of the present invention to provide an improved stud spacing guide overcoming the foregoing and other shortcomings of the prior art. Specifically, it is an object to provide a guide by which proper spacing for the studs is readily determined and which further has provision for being itself held in place such that it, in turn, can confine the stud being attached against movement from the location selected for the stud.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein.

Figure 1:
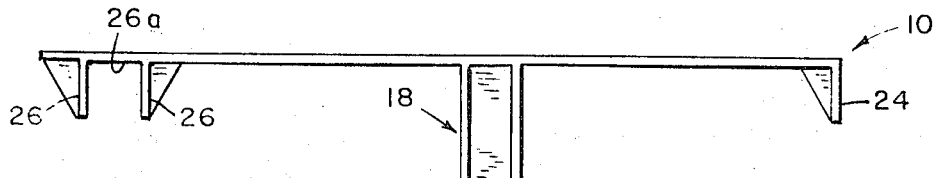
FIGS. 1, 2 and 3 are respectively a plan view, front elevational view, and rear elevational view of the guide according to the present invention.
Figure 2:
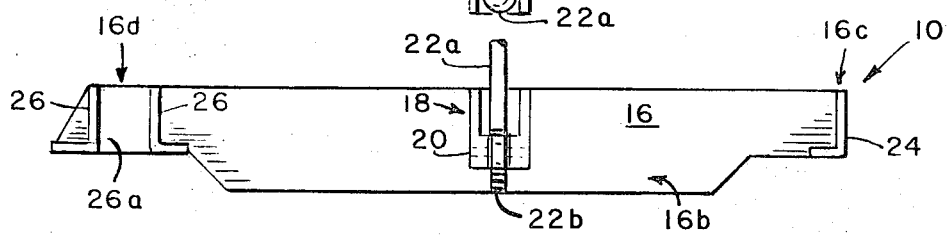
Figure 3:
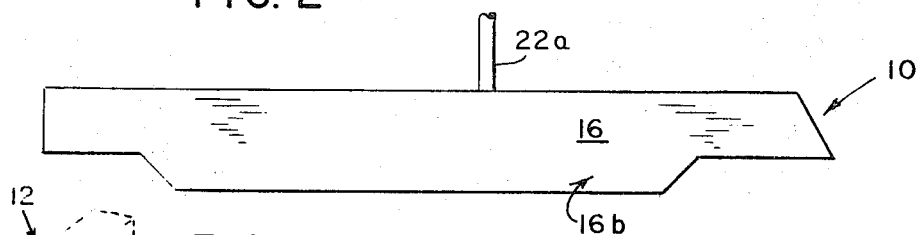
Figure 4:
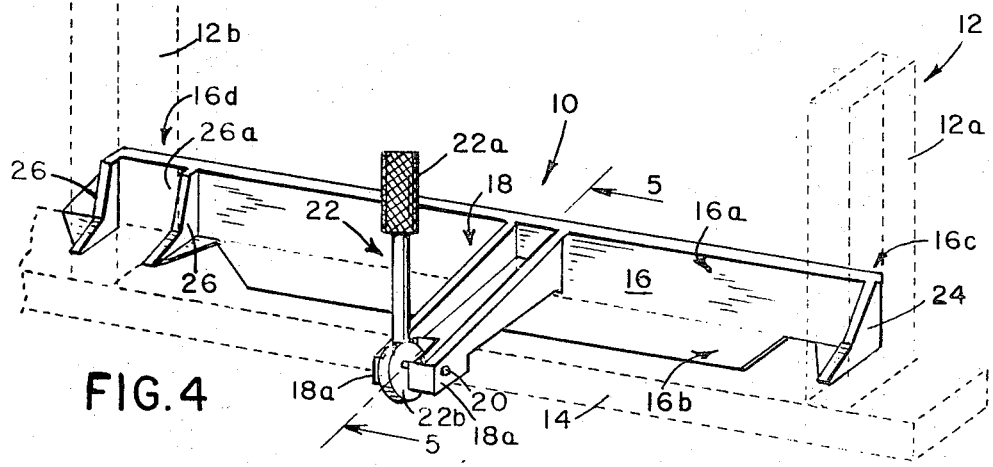
FIG. 4 is a perspective view illustrating the manner of using the guide and wherein the horizontally and vertically oriented structural members or beams are illustrated in phantom perspective.
Figure 5:
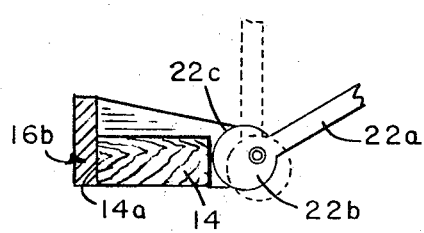
FIG. 5 is a side elevational view, taken in section on line 5—5 of FIG. 4, illustrating further structural features of the guide.

Reference is now made to the drawings, and in particular to FIGS. 4, 5, wherein a stud-spacing guide, generally designated 10, is illustrated in its contemplated operative position in which it is effective in facilitating the spacing and securement of vertically oriented studs or structural members 12 at prescribed spaced intervals, as for example 16 inches, along a horizontally oriented beam or structural member 14. As generally understood, the attaching of the studs 12 along the beam 14 is a conventional preliminary in the construction of a wall to be supported on the studs 12. Assuming that the stud 12a is properly secured to the beam 14, the guide 10 hereof greatly facilitates both the placement of the next stud 12b at a prescribed distance from the stud 12a and also the securement of the stud 12b to the beam 14, all as will now be described in detail.

The guide 10 includes a generally planar body 10a which, in the operative position of the guide 10 as illustrated in FIG. 4, results in an upper edge and the portion adjacent thereto, herein designated 16, occupying an exposed clearance position above the beam 14 and a lower edge and portion adjacent thereto, herein designated 16b, occupying a position depending below the upper surface of the beam 14 and in contact against the remote side 14a thereof (See FIG. 5). Planar body 16, as clearly shown in FIG. 4, is generally of an elongated, rectangular shape wherein the opposite sides 16c and 16d are spaced from each other a distance corresponding to the spaced interval at which it is desired to place the studs 12a, 12b along the horizontal beam 14.

In a preferred embodiment of the guide 10 as illustrated herein, there is a centrally located, laterally extending leg 18 which at its free end branches into bifurcated supports 18a for a horizontally oriented pivot pin 20. A cam lock 22, including a handle 22a and a cam 22b having a peripheral engaging surface 22c is arranged for pivotal movement about the pivot pin 20, the pin 20 being more particularly disposed in an eccentric location, as best illustrated in FIG. 5, through the cam 22b so that pivotal movement of the cam lock 22 is effective to project the engaging surface 22c from a starting clearance position removed from the body lower depending portion 16b into a position closer thereto, with the result that the beam 14 is clamped between the body lower depending portion 16b and the cam-engaging surface 22c.

Completing the construction of the guide 10 is a laterally extending guide 24 adjacent the body end 16c which, during the use of the guide 10, is placed flush against the already secured vertical stud 12a preparatory to determine the proper location for the next vertical stud 12b. With the guide 24 in position against the stud 12a the cam lock 22 is operated, in the manner just described, to firmly clamp the guide in position on the beam 14. Adjacent the body opposite end 16d, there is provided an additional pair of spaced apart, laterally extending guides 26, the spacing therebetween defining a compartment 26a of an appropriate size and extent to accommodate therein the next vertical stud 12b which, merely as a result of being placed within the compartment 26a is automatically located the required distance from the vertical stud 12a. In addition to properly spacing the stud 12b from the stud 12a, guide 10 also greatly facilitates making the attachment or securement of the stud 12b to the beam 14 while preserving the spacing between the studs 12a, 12b. This results from the stud 12b being confined to the compartment 26a while it is being nailed to the beam 14. Ordinarily, in the nailing of a stud to a beam without the benefit of the guide 10, the stud will invariably be shifted out of position by the force of the hammer striking the stud. In this instance, however, the guides 26 hold the stud 12b against movement during the placement of nails through the sides of the stud while the body end portion 16b bounding the compartment 26a similarly holds the stud 12b against movement during the application of a nail through the front of the stud 12b. After securement of the stud 12b to the beam 14 is completed, guide 10 is readily removed from its engaged position about the beam by merely releasing the cam lock 22. Although a cam lock is preferred, it should readily be appreciated that a threadably adjustable member having a clamping or engaging surface at a distal end can effectively be substituted for the cam lock.

A latitude of modification, change and substitution is intended in the foregoing disclosure and in some instances some features of the invention will be employed without a corresponding use of other features.

I claim:

1. A guide for securing vertically oriented structural members at spaced intervals along a horizontally oriented structural member, said guide comprising a planar body including upper, lower and opposite side edges, said body being operatively arranged during the use of said guide in contact against the side of said horizontally oriented structural member with only said lower edge in depending relation therewith and said upper edge in a clearance position thereabove, a leg on said body located in the medial area adjacent the upper edge thereof and extending laterally therefrom, an adjustably movable member having an engaging surface thereon in facing relation to said depending lower edge operatively arranged for movement from a clearance position to a position closer to said depending lower edge so as to clamp said horizontally oriented structural member therebetween, a guide on said body located adjacent one side thereof and extending laterally therefrom in substantial parallel relation to said laterally extending leg, and a pair of spaced apart guides on said body located adjacent said other side thereof and similarly extending laterally therefrom in substantial parallel relation to said laterally extending leg, whereby said pair of spaced apart guides define a positioning compartment therebetween for locating and holding a vertically oriented structural member during the securement thereof to said horizontally oriented structural member.

2. A guide as defined in claim 1, wherein said adjustably movable member is an eccentrically rotatably mounted cam.